United States Patent Office 3,249,444
Patented May 3, 1966

3,249,444
PROCESS OF INCREASING THE TINCTORIAL POWER OF CARAMEL COLOR AND CARAMEL COLOR PRODUCED THEREBY
George N. Bollenback, Hastings on Hudson, N.Y., Hyman M. Molotsky, Chicago, Ill., and Henry H. Sharton, Canton, Ohio, assignors to Corn Products Company, New York, N.Y., a corporation of Delaware
No Drawing. Filed Mar. 20, 1964, Ser. No. 353,593
8 Claims. (Cl. 99—148)

This application is a continuation-in-part of U.S. Serial No. 175,301, filed February 23, 1962, now abandoned.

This invention relates to a method for producing caramel color of high tinctorial power and, more particularly, to the use of ultrafiltration as a means for increasing the tinctorial power of commercial caramel color, and the method by which this can be accomplished.

Caramel color is made commercially by heating a sugar solution with or without the addition of catalysts. In currently used processes, the extent of heating is limited because if the heating process is carried too far, reactions occur which impart undesirable characteristics to the caramel color product, such as charring, unmanageable viscosities and instability. Commercial caramel color, which has not been refined beyond the conventional caramelization and having a minimum of undesirable properties, contains color-imparting bodies accounting for only 10–12 percent of the product, the remainder being materials, mostly un-caramelized sugars, not contributing directly to coloring power. Coloring power, or tinctorial power, is the basis on which caramel color is marketed commercially; the higher the tinctorial power, the more attractive is the product to the user. It becomes a practical matter, therefore, for manufacturers of commercial caramel color to have economic means for supplying products of high tinctorial power.

Processes which are described in the prior art for the purpose of producing caramel colors with tinctorial power increased over that obtained by the conventional caramelization process include separation of a color body concentrate by addition of coagulating agents to the caramel color, separation of a color body concentrate from caramel color previously treated with microorganisms, and dialysis of caramel color to obtain a color body concentrate.

Addition of coagulating or precipitating agents, such as water-soluble alcohols, to caramel colors for the purpose of producing caramel colors of increased tinctorial power as well as for separating color bodies from commercial colors is described in U.S. Patents 2,533,221, 2,637,655 and 2,902,393. This method, which produces concentrates having about 3 to 5 times the tinctorial power of the original caramel color, is a relatively complicated and expensive one, involving stripping off and recovering the alcohols, taking the necessary precautions to guard against fire hazards attendant upon use of flammable materials, and many other steps which make this process commercially unattractive.

An alternate method for removing uncaramelized sugars in commercial caramel colors is to subject the caramel colors to the action of a microorganism as described in U.S. Patent 2,873,193. This is a multistage process involving removal of bacterial inhibitors from the original caramel color by dilution with water followed by evaporation, inoculation for fermentation, and separation of color bodies from fermentation products by any of several methods. Considered as a process for making caramel colors of increased tinctorial power, this method becomes impractical and uneconomical because of the relatively great number of operations involved.

Dialysis as a method for increasing the tinctorial power of caramel color is described in U.S. Patent 2,701,768. In this process the caramel color flows against a membrane surface and water is passed countercurrently against the opposite side of the membrane. The crystalloidal non-color materials pass through the membrane into the water phase, while the colloidal color bodies are retained by the membrane. This method is not commercially feasible for a number of reasons, one being that the process takes an extremely long time. Another disadvantage is that excessive dilution of the color concentrate occurs during the process. This necessitates evaporation of the excess water, which not only adds to the complexity and cost of the process, but, because water from most available sources contains inorganic salts, a high percentage of inorganic cations will be incorporated into the final color concentrate. The problem of contamination by inorganic cations is a particularly difficult one when dealing with caramel color. Unlike most colloids, caramel color bodies actually act as ion exchangers, and have a strong tendency to pick up and retain inorganic cations, as well as other extraneous materials. For this reason any process using large volumes of water, or any process requiring a substantial length of time (during which time contaminants are likely to enter the system) is extremely undesirable for caramel color. It is striking to note, for example, that a color body concentrate obtained by dialysis of a commercial acid proof type caramel color against Chicago tap water contains a high concentration of calcium (2.0–2.4 percent on a dry basis). The cost of using distilled water in a commercial operation would, of course, be prohibitive.

We have discovered a method by which the color bodies of caramel color can be rapidly and efficiently separated from the non-color materials by means of ultrafiltration. There are a number of advantages to our process over those of the prior art. Large volumes of caramel color can be processed, the volume being dependent merely upon the size and capacity of the equipment. Inexpensive equipment can be used in the process (this will be more fully discussed hereinafter). By our process, all of the sugar (i.e., the uncaramelized sugar) can be separated from the caramel color, which results in the following advantages: (1) Caramel color having extremely high tinctorial powers (up to 10 times that of the original) can be produced. To the best of our knowledge, no known commercial process can match this increase. (2) These caramel colors are eminently suitable for use in the so-called "diet" or "low calorie" soft drinks. (3) Because of the absence of hygroscopic sugar in the color concentrate, the concentrate can be dried to a friable powder which is exceptionally stable to conditions of high humidity. (4) Because of the absence of sugars the caramel color concentrate, either in liquid or dry form, is exceptionally stable to biological deterioration. Another advantage is that the process can be controlled so that the filtrate, containing the sugar, contains very litthe caramel color, and therefore can be reprocessed with little or no build up of ash.

For many years ultrafiltration (i.e. filtration under pressure through a semi-permeable membrane) has been known and used in laboratories, and is a valuable research tool in the fields of biochemistry, immuno-chemistry and related biological sciences in which sharp separation is likely to be critical but volume is strictly limited. Ultrafiltration has never gained acceptance in large volume commercial operations. however, primarily because the pores of the membranes quickly become plugged, rendering the process not only extremely slow but hazardous. Known techniques of preventing plugging, or "blinding," of the filter media in conventional filtration, such as precoating or back-washing, are ineffective for ultrafiltration.

An attempt to apply ultrafiltration to large scale operations can be found in U.S. Patent 2,864,506, Hiskey. In this method a long, tubular membrane is used, which is inserted into and supported by a porous sleeve. Although the Hiskey device is undoubtedly an improvement over known ultrafiltration devices with respect to capacity, the improvement is merely relative in that the device cannot begin to match conventional filtration and other separation methods in respect to volumes required in a great many commercial separations.

According to our invention commercial caramel color having a density of up to about 38° Bé. is filtered, under pressure and with substantially continuous agitation, through a semi-permeable membrane. The color imparting bodies in the caramel color, being polymeric in nature, are refused passage by the membrane while those substances in caramel color which contribute little or nothing to the coloring or tinctorial power pass through the membrane. By this means, material retained by the membrane contains an increased concentration of color bodies and thus has a relatively higher coloring power or tinctorial power than the original caramel color.

By "commercial caramel color" is meant any of the varieties known and used in the trade, e.g. acid fast caramel color, beer caramel color, and caramel color made by heat treatment alone. Commercial caramel color is generally supplied at a density of about 38° Bé. (60° F.) (approximately 70% solids) or less. Our process has been successfully practiced using densities of 32° Bé. or lower. It could undoubtedly be applied to solids concentrations of up to 38° Bé., and probably to much higher densities, but because of the relationship between temperature, pressure, concentration and rate of filtration (which will be fully discussed hereinafter), and because one would have to evaporate an available caramel color in order to reach a density higher than 38° Bé. (which would mean an additional and totally unnecessary step), we have set the upper limit as to density of the starting material at about 38° Bé.

The semi-permeable membranes suitable for use in the practice of this invention may be made from cellulosic substances or synthetic plastic material and have a pore size within the range of 10–10,000 angstroms, preferably 30–100 angstroms. A varied selection of available semi-permeable membranes can be used in this process. The Nalfilm membranes are preferred in our invention for caramel colors acidic in nature (i.e. acid-fast caramel colors) because of their superior chemical stability over cellulosic membranes. These materials are marketed by the Nalco Chemical Company and are made from a synthetic vinyl plastic. The pore sizes of the Nalfilm membranes are not usually expressed in angstrom units, but rather in terms of thickness of the membrane in mils plus the electrical resistance of the membrane as measured by dialysis of a 1% aqueous potassium chloride solution. The higher the electrical resistance and the thicker the membrane the smaller the pore size. It should be noted that although the Nalfilm membranes are preferred for acid-fast caramel colors, this is not meant to be restrictive, and any available semi-permeable membrane can be used for the ultrafiltration of caramel color.

The pressures and temperatures used in the practice of this invention depend to a great extent upon the membrane used. Pressures of up to 100 p.s.i. have been used successfully in conducting this process. Pressures much lower than 20 p.s.i. have been found to be ineffective for all practical purposes.

The Nalfilm membranes currently available have a specified maximum working temperature of 120° F. so that the limiting temperature for the present process is dependent on the heat stability of the membrane. With these available membranes a temperature range of 60°–115° F. has been used successfully. With membranes constructed to withstand higher temperatures, the maximum working temperature range could be increased to over 200° F. without detrimental effect on the product of this invention.

Continuous, or substantially continuous, agitation of the caramel color during the ultrafiltration is absolutely necessary to our process. Any method by which such agitation can be accomplished may be used, and suitable methods will be shown in the examples. The agitation need not be particularly violent, but it must be such as to keep the colloidal color bodies in substantially continuous motion.

In conducting the process of this invention any of the well known equipment for ultrafiltration may be used, provided that it is so modified that the necessary agitation takes place. In addition, a plate-and-frame filter press equipped with thickener plates is effective for operating either on a laboratory or plant production level. In such a press, the material being filtered circulates through the press, thereby effecting the necessary agitation. For laboratory or small-scale filtrations, we prefer either a 2.5 liter pressure filter equipped with stirrer or a plate-and-frame press equipped with 7-inch square thickener plates. Presses with larger thickener plates (e.g. 2 ft. square–3 ft. square) are quite effective for commercial (i.e. large volume) operations, the size of plates being dependent on output volume required. The 2.5 liter pressure filter which we found to be very effective was a Horm laboratory filter (F. R. Hormann & Co., Inc.), consisting of a Pyrex cylinder, approximately 4.5 inches in diameter, and is equipped with a perforated filter plate.

There is an inter-relationship among temperature, pressure, density and rate of filtration, which can be briefly stated as follows: filtration rate increases as the temperature increases, as the pressure increases and/or the density of the caramel color being filtered decreases. Another variable to be considered is the pore size of the membrane being used. As is stated above, membranes having pore sizes of 10 to 10,000 angstroms are operable. It should be noted that with the smaller pores a sharper separation can be obtained, but, all other factors being constant, the process will be slower. The following data are presented to illustrate generally the inter-relationship of the variables.

Using the small (7-inch) plate-and-frame press referred to in the preceding paragraphs (and described in Example I), two solutions of double strength acid-fast caramel color, one having a dry substance content of 49% and the other having a dry substance content of 40%, were filtered at a pressure of 60 p.s.i. and a temperature of approximately 80° F. The plates were covered with Nalfilm FS–200 semi-permeable membranes. The rate of filtration of the 49% solution was 325 milliliters/hour/square foot of membrane, that of the 40% solution was 1600 milliliters/hour/square foot of membrane.

Two other runs were made using the 2.5 liter pressure filter described in Example II. In both these runs a 17.6% (dry substance) caramel color solution was filtered at 40 p.s.i. In the first run a Nalfilm membrane having pores of approximately 100 angstroms (average) was used (membrane thickness, 3.8 mils; electrical resistance, 1.0 ohm per square centimeter); in the second a Nalfilm membrane having smaller pores (membrane thickness, 3.9 mils; electrical resistance, 2.2 ohms per square centimeter) was used. The rate of filtration in the first run was 2.38 liters/hour/square foot of membrane, that of the second run was 1.89 liters/hour/square foot of membrane.

One skilled in the art will have no difficulty in determining the optimum conditions of temperature, pressure, density and membrane pore size for a particular operation.

For a better understanding of the nature and objects of this invention, reference should be made to the accompanying examples which are of an illustrative rather than a limiting nature.

In the examples the tinctorial power of the original caramel color is expressed in the terms of Klett values, and the tinctorial power of the end products is expressed either in terms of Klett values or in terms of increase over the tinctorial power of the original. Klett values are determined by diluting 20 grams of a 38° Bé. caramel color to one liter with water and matching this sample against the standard color disc on a Klett colorimeter (Klett Manufacturing Company). The higher the Klett value, the lower the tinctorial power, for example, a caramel color with a Klett value of 8 has twice the coloring power of a caramel color with a Klett value of 16.

In order to make a rational comparison, coloring or tinctorial powers of various materials were related on a dry substance rather than on basis of density (Bé.). Thus, when a color concentrate is stated to have 5 times the tinctorial power of the starting material it is meant that a given weight of product solids in a given volume gives 5 times the coloring power of an equal weight of starting material solids in the same volume. Thus generally stated, a product with "increased tinctorial or coloring power" has greater coloring power than the starting material when the two are compared on an equal dry substance per volume basis.

EXAMPLE I

This example illustrates the preparation of what is known in the trade as a double strength acid-fast caramel color. The equipment used was laboratory model filter press equipped with 7-inch square thickener plates to give a total of 4 filtration chambers. The plates were covered with Nalfilm FS–200 semi-permeable membrane which was backed by a 10-ounce duck cloth.

The starting material was 10 gallons of a single strength (Spencer color X–100=184; Klett=8.5) acid-fast caramel color prepared by a conventional process. This liquor was diluted with water to give 13 gallons of 30.0° Baumé solution and charged into a 15-gallon reservoir. The liquor was circulated through the press at a pressure of 60 p.s.i. and a temperature of 70°–92° F. (In a similar run temperatures of 90°–115° F. were used with a marked increase in rate of filtration without any noticeable deterioration of the products.) The circulation of the liquor kept it in a state of continuous agitation. That portion of the circulating liquor containing mostly low molecular weight carbohydrates passed through the membrane and was collected as the filtrate. The remainder of the liquor containing an increased concentration of color bodies was passed back into the feed reservoir and thence recirculated through the press. The density of the liquor in the reservoir was maintained at 27°–29° Bé. for the greater part of the filtration, and at 22° Bé. toward the end of the operation by adding water. The progress of the filtration was followed by removing samples periodically from the reservoir and taking a color reading. The filtration was stopped after 42.8 liters of filtrate, containing 52 percent solids, was collected. The liquor (approximately 25.3 liters) in the reservoir was concentrated by evaporation to give 4.7 gallons of 29.1° (60° F.) Bé. double strength acid-fast caramel color (Klett=3.8). This product satisfied all specifications set by the beverage industry for a double strength acid-fast caramel color.

EXAMPLE II

This example illustrates the preparation of a caramel color of exceptionally high tinctorial power.

The filtration was carried out in a standard 2.5 liter pressure filter (Horm laboratory filter) modified by the introduction of a stirrer, by means of which the caramel color was kept in a state of agitation. The Nalfilm D–30 (wet) membrane used (pore size approximately 50–80 angstroms; thickness, 4–4.5 mils; electrical resistance, 2 ohms per square centimeter) was supported by a filter pad.

There was charged to the filter 2070 grams of a single strength (Klett=9.2) acid-fast caramel color (containing 1500 grams of dry substance) which had been diluted with water to 5 liters total volume. The filtration was carried out with stirring under an air pressure of 38–40 p.s.i. and temperature of 75°–80° F. Water (Chicago tap water) was added to the filter periodically and filtration was continued until 27 liters of filtrate had been collected. The liquor remaining in the filter was lyophilized to a dry friable powder which was unaffected under conditions of 60 percent relative humidity over a period of 3 weeks. The dry powder was readily reconstituted in water to give a solution having a tinctorial power 9.3 times that of the starting caramel color. The high tinctorial power fraction contained 104 grams of dry substance (6.9 percent by weight of the original) and retained 62 percent of the original color bodies. The filtrate fraction contained 1400 grams of dry substance (94 percent by weight of the original) and retained 38 percent of the original color bodies. This fraction, however, had a tinctorial power of only ⅓ that of the original caramel color.

In a similar run the high tinctorial power fraction was roll-dried to produce a dry friable powder having properties similar to those of the powder obtained above by lyophilization.

The very high tinctorial power product obtained as per this example contained no analyzable calcium when the water used was Chicago tap water.

EXAMPLE III

This example illustrates the preparation of a series of the caramel colors having tinctorial powers increased to different degrees by control of the extent of pressure filtration. The equipment used was the same as that used in Example II. The semi-permeable membrane used in this series was Nalfilm D–30 (dry), a somewhat more porous membrane that the Nalfilm D–30 (wet) used in Example II. The filtration was carried out with stirring under an air pressure of 38–40 p.s.i. and a temperature of 75°–80° F. Table I summarizes the results of five experimental runs in which the main variable was the extent of filtration.

The following observations can be made based on the results in Table I.

(1) As the tinctorial power of the fraction containing predominantly color bodies increases, the percent weight retention decreases and the percent color body retention decreases.

(2) The amount of solids in the filtrate collected per kilogram of solids charged can be used to predict the approximate increase of tinctorial power of a given product.

It is possible to prepare curves for various membranes based on a number of control runs and thus help in estimating the quantity of dry substance that must be collected in the filtrate in order to attain a given desired tinctorial power.

Table I

| Run No. | Charge of Caramel Color (D.B.) | Concentration of the Solution Filtered (percent D.S.) | Liters of filtrate per kg. Charge (D.B.) | Grams of Solids in filtrate per kg. Charge (D.B.) | Tinctorial Power [a] | Color Concentrates | |
|---|---|---|---|---|---|---|---|
| | | | | | | Percent Solids Retention | Percent Color Bodies Retention |
| 1 | 512 | 25.6 | 5.7 | 854 | 5.4 | 10.1 | 56.3 |
| 2 | 520 | 26.0 | 7.0 | 733 | 3.7 | 17.5 | 67.2 |
| 3 | 520 | 26.0 | 5.3 | 693 | 2.8 | 25.6 | 74.6 |
| 4 | 503 | 25.1 | 2.8 | 563 | 2.3 | 37.8 | 80.3 |
| 5 | 521 | 26.1 | 2.8 | 480 | 1.8 | 47.6 | 90.2 |

[a] Times tinctorial power of starting caramel color, i.e., Run No. 1 product had 5.4 times the tinctorial power of the starting material.

EXAMPLE IV

Using the same equipment as described in Example II, including the same type of membrane, a solution of beer caramel containing 169 grams of dry substance was filtered. The filtration was continued until a total of 7.4 liters of filtrate was collected containing 153 grams of dry substance. The fraction retained by the membrane (14.0 grams solids) was lyophilized, resulting in a dry friable powder which could be readily reconstituted. This fraction contained 8.3 percent of the originally charged solids and had a tinctorial power 4 times that of the starting caramel color.

During each run the rate of filtration was observed, so that any lessening in the rate, which would indicate clogging of the pores, would be noted. At no time during any of the runs was a loss in filtration observed. Furthermore, at the end of each run the membrane used was visually checked for pore clogging against a light source; in no instance was any clogging perceived.

We claim:

1. A process for increasing the tinctorial power of caramel color which comprises subjecting a caramel color having a density of not more than about 38° Bé. to ultrafiltration through a semi-permeable membrane, the caramel color being substantially continuously agitated during the ultrafiltration, the ultrafiltration being conducted at a pressure within the range of about 20 p.s.i. and about 100 p.s.i.

2. Process according to claim 1 wherein the semi-permeable membrane is made from a cellulosic substance.

3. Process according to claim 1 wherein the semi-permeable membrane is made from a synthetic vinyl plastic.

4. Process according to claim 1 wherein the ultrafiltration is conducted at a temperature within the range of about 60° to about 200° F.

5. Process according to claim 1 wherein the ultrafiltration is conducted at a temperature within the range of about 60° to about 120° F.

6. A process for separating the color-imparting bodies of caramel color from the non-color-imparting bodies which comprises subjecting a caramel color having a density of not more than about 38° Bé. to ultrafiltration through a semi-permeable membrane, the caramel color being kept in a state of substantially continuous agitation during the ultrafiltration, the ultrafiltration being conducted at a pressure within the range of about 20 p.s.i. and about 100 p.s.i.

7. A process for obtaining a high tinctorial caramel color in the form of a dry friable powder being exceptionally stable under conditions of high humidity which comprises subjecting a caramel color having a density of not more than about 38° Bé. to ultrafiltration through a semi-permeable membrane, the caramel color being kept in a state of substantially continuous agitation during the ultrafiltration, the ultrafiltration being conducted at a pressure within the range of about 20 p.s.i. and about 100 p.s.i. and subsequently drying the resulting color concentrate.

8. A high tinctorial power caramel color in the form of a dry friable powder, produced by the process of claim 7, which is exceptionally stable under conditions of high humidity.

References Cited by the Examiner

UNITED STATES PATENTS 2,574,533  11/1951  Cornwell et al. _____ 210—23
2,701,768  2/1955  Cleland et al. _____ 127—34 X

OTHER REFERENCES

Browne and Zerban: Sugar Analysis, third edition, 1941, John Wiley, pp. 1094–1098 relied on.

Weissberger: Technique of Organic Chemistry, second edition, 1956, vol. III, part I, Separation and Purification, Interscience Publishers, New York, pp. 65–67, 86–87 and 711–714.

MORRIS O. WOLK, *Primary Examiner.*

M. E. ROGERS, *Assistant Examiner.*